United States Patent [19]

Debbaut et al.

[11] Patent Number: 4,670,069
[45] Date of Patent: * Jun. 2, 1987

[54] PROTECTION OF CABLE SPLICE

[75] Inventors: Christian A. M. Debbaut, Cary, N.C.; Norman Gac, Palo Alto, Calif.; Eugene F. Lopez, Sunnyvale, Calif.; Wendell W. Moyer, Atherton, Calif.; David Terrell, Fuquay-Varina, N.C.; Patrick K. Tsou, Halfmoon Bay, Calif.

[73] Assignee: Raychem Corp., Menlo Park, Calif.

[ * ] Notice: The portion of the term of this patent subsequent to Aug. 21, 2001 has been disclaimed.

[21] Appl. No.: 801,505

[22] Filed: Nov. 25, 1985

Related U.S. Application Data

[63] Continuation of Ser. No. 652,354, Sep. 18, 1984, abandoned.

[51] Int. Cl.⁴ .................................... H01B 13/06
[52] U.S. Cl. ................................. 156/48; 156/49; 156/53; 156/56; 156/79; 174/92; 174/110 F; 174/116; 428/36; 428/304.4
[58] Field of Search ............... 156/48, 49, 53, 56, 156/78, 79; 174/23 R, 76, 88 R, 92, 110 F, 116; 428/36, 304.4, 377; 264/46.5, 46.6

[56] References Cited

U.S. PATENT DOCUMENTS

| | | |
|---|---|---|
| 1,756,080 | 4/1930 | Austin . |
| 1,775,776 | 9/1930 | Ober et al. . |
| 2,050,888 | 8/1936 | Kirch . |
| 2,740,825 | 4/1956 | Rifenburg . |
| 3,339,011 | 8/1967 | Ewers et al. . |
| 3,361,605 | 1/1968 | Gilberg ................................. 156/48 |
| 3,639,567 | 2/1972 | Hervig . |
| 3,652,777 | 3/1972 | Elliott .............................. 174/11 R |
| 3,895,180 | 7/1975 | Plummer ............................. 174/92 |
| 3,955,043 | 5/1976 | Palmer et al. ............... 174/110 F X |
| 3,992,569 | 11/1976 | Hankins et al. ....................... 174/92 |
| 4,209,352 | 6/1980 | Diaz et al. ............................ 156/49 |
| 4,466,843 | 8/1984 | Shimirak ............................. 156/48 |

OTHER PUBLICATIONS

H. Fukutomi, "Prefabricated Pressure Dam For Telephone Cable", Proc. of 20th Intl. Wire and Cable Symposium, 1971.

Pirelli General Cable Works Ltd. "Jointing Instructions", Aug. 1973.

"Resinwrap Joints" Brochure from Pirelli General.

Primary Examiner—Robert A. Dawson
Attorney, Agent, or Firm—T. Gene Dillahunty; Herbert G. Burkard

[57] ABSTRACT

A splice between two multiconductor cables is protected from ingress of water by a closure which is filled with an expanding foam sealant which provides pressure inside the closure sufficient to force the sealant into the interstices of the splice and the interstices between the conductors in the cable, which pressure is retained in the closure until the sealant cures or hardens.

5 Claims, 1 Drawing Figure

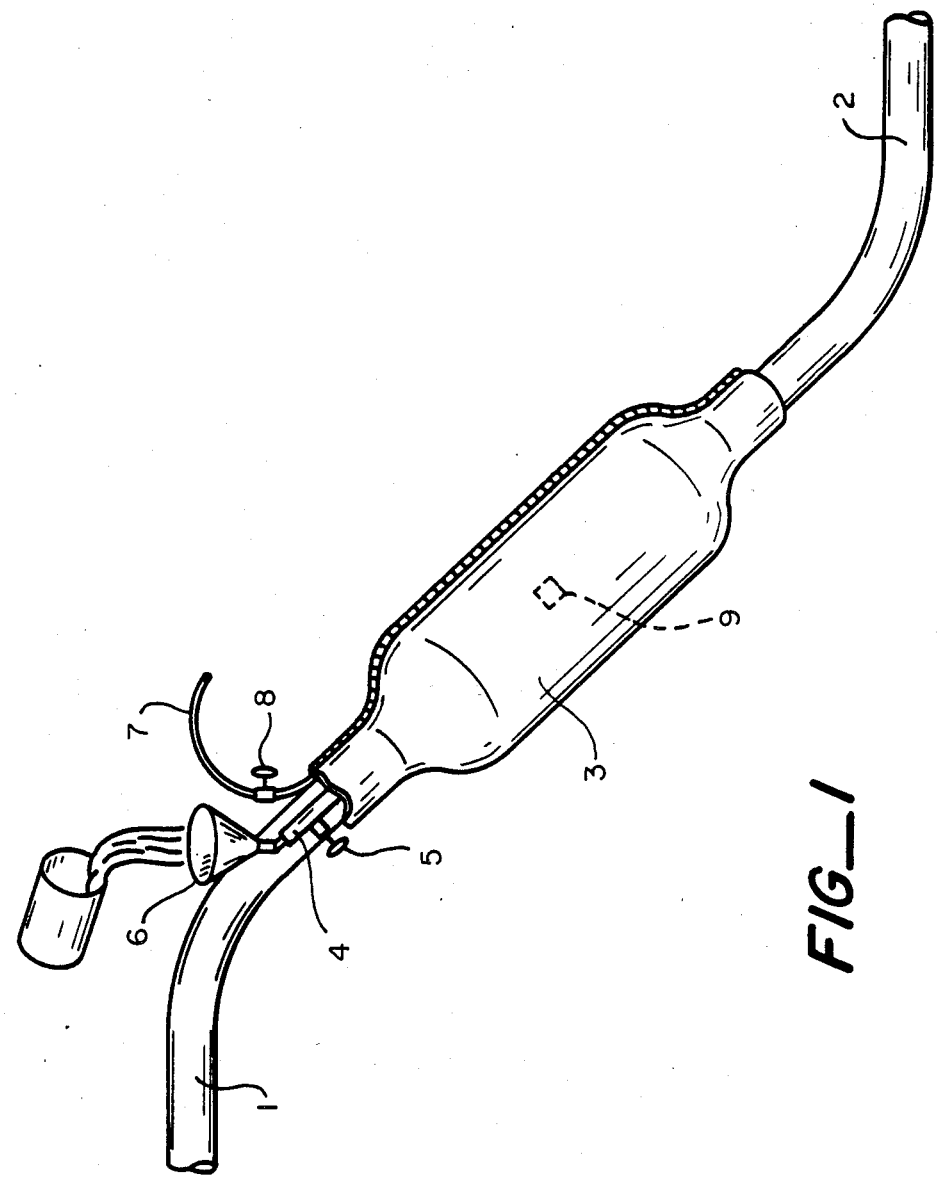
FIG_1

PROTECTION OF CABLE SPLICE

This application is a continuation of application Ser. No. 652,354, filed Sept. 18, 1984 and now abandoned.

BACKGROUND OF THE INVENTION

This invention relates to protecting a splice of multi-conductor electrical cables from the ingress of water. Of particular interest are communication cables, such as telephone cables.

The multiconductor communications cables usually comprise a core containing a plurality of individually insulated wire conductors surrounded by an outer sheath. The cable core may contain a few pairs of conductors up to several hundreds or even thousands of pairs of conductors. The outer sheath of the cable usually is a plastic jacket surrounding a metal shield. Additional inner polymeric layers may be present. The cables are usually referred to as "filled" cables because the cable is usually filled with a filling compound such as a grease or petroleum jelly which helps prevent the ingress of water into the cable.

When two or more of the cables are spliced together, the jacket and other layers of the cable are removed near the end of the cable to expose the individual insulated conductors which are then individually connected to the conductors from the other cable or cables. After completion of the splice the entire splice area must be protected from ingress of water. Various devices and methods have been used for protection of such splices such as U.S. Pat. Nos 3,361,605 to Gilbert, 3,895,180 to Plummer, and 3,992,569 to Hankins et al. Plummer and Hankins are typical examples of methods and apparatus used to protect cable splices of the type referred to above and are sometimes referred to as "buried splice closures." These types of cables are commonly used underground and the splices must be protected to prevent ingress of water when they are buried underground.

It is generally recognized that one of the paths through which water may enter the splice area and damage the individual spliced conductors by corrosion or short circuit is by migration through the interior of one or more of the cables spliced. Since such water migration occurs in the "filled" cables, it is necessary to provide splice protection method and apparatus to prevent water from entering the splice area from any path, including through the interior core of the cable. U.S. Pat. No. 4,466,843 to Shimirak recognized the importance of applying pressure to the liquid sealant while the liquid sealant cures to form a water impenetrable seal.

The liquid sealants used to protect splices of the type referred to herein are generally curable liquid polymer systems which comprise a prepolymer and a curing agent or hardener which can be mixed together and poured into the splice enclosure and allowed to cure. Particularly useful curable liquid sealants are the two-part polyurethane systems. The sealants normally used solidify to a gel-like consistency, i.e., the solid cured sealant has considerable elasticity to allow the sealant to conform to changes in size or shape of the splice area due to expansion or extraction or other mechanical forces acting on the splice area. These sealants are also usually reenterable.

U.S. Pat. No. 3,639,567 to Hervig discloses the use of expanding foams to form cable blocks. In this application it appears important that the viscosity of the material increase to a fairly high level before the expansion of the material begins. It also appears important that the expansion of the material not exceed about 25 percent in volume.

SUMMARY OF THE INVENTION

This invention provides a method for protecting a multi-conductor cable splice from the ingress of water by providing a closure around the splice area sealed to the cable jackets and introducing into the closure a sealant which will expand, for example by foaming, to fill all the voids inside the closure, including in and around the splice connectors and in the interstices between the conductors and the cables, as well as expand enough to provide an internal pressure inside the closure to force the expanding sealant to fill all of said voids.

This invention comprises a method for protecting a splice connecting at least two multi-conductor electrical cables from ingress of water which comprises:

(a) positioning a closure about the splice and sealing the closure to the cable jackets to form an enclosed area for the splice and the cable ends wherein the closure has an opening for introducing sealant into the enclosed area and a vent opening for venting air therefrom;

(b) introducing into the enclosed area a liquid sealant which will expand at least 50 percent in volume and will cure to a solid form to protect the splice, wherein the amount of the liquid sealant introduced into the enclosed area inside the closure is such that when the sealant expands the volume of the expanded sealant will exceed the volume of the enclosed area by a sufficient amount to generate pressure inside the closure to force the expanding sealant to penetrate into the splice and into the interstices between the conductors in the cables;

(c) allowing air to escape from the vent opening while the sealant is expanding;

(e) allowing the sealant to expand and generate said pressures and to cure under said pressure.

BRIEF DESCRIPTION OF THE DRAWING

FIG. 1 illustrates a cable splice closure useful in the method of this invention.

DETAILED DESCRIPTION OF THE INVENTION

Various closures can be adapted for use in the method of this invention, including the closures of U.S. Pat. Nos. 3,455,336 to Ellis, 4,135,587 to Diaz, 4,283,239 to Corke et al., and 4,468,536 to Van Noten. It is only necessary that the closure employed in this invention have at least one opening for introducing the sealant into the closure and an opening to vent the air from the closure when the sealant expands. A single opening may provide both functions. The closure must be of sufficient strength to withstand the pressure generated by the expanding sealant and must form a sufficiently tight seal around the cable jackets to contain the pressure generated. The closures generally preferred are the wraparound heat-recoverable type disclosure such as in Van Noten and Ellis.

The sealant employed in this invention is a liquid system which is usually a two-part system mixed together just before the desired use. After mixing the parts of the sealant the system should provide a sufficient latent period necessary for introducing the liquid sealant into the closure. After the latent period the sealant will expand, for example by foaming, in volume, thereby displacing the air from the interior of the closure through a vent and, after the vent is closed, will expand to create pressure within the closure to force the liquid sealant into the splice and into the interstices between the conductors in the cables. In order to obtain sufficient displacement of the air and generation of pressure within the closure it is necessary that the liquid sealant expand at least about 50 percent in volume. The desired amount of expansion of the sealant will depend upon the size and configuration of the splice and closure employed. Liquid sealants which expand 100 percent to 300 percent or more can be conveniently employed in this invention. Expanding or foaming liquid systems are well known in the art and are available in many types of systems with varying properties which are specified by the manufacturers. In general, it is preferred to use the foaming urethane liquid systems in this invention due to their availability and well-established properties. In particular, it is preferred to use a foaming urethane which will expand about 100 percent to about 300 percent in volume and will cure after expansion to form a semi-flexible foam which is predominantly a closed-cell structure and preferably about 90 percent closed cell. The selection of the appropriate expanding sealant for a particular application will be readily apparent to one skilled in the art following the teachings of this invention.

The amount of liquid sealant system used in any particular splice closure will depend on the percent volume expansion of the liquid sealant system, the pressure desired in the closure during curing of the sealant, the amount of venting of the sealant during expansion, and of course on the actual void volume existing inside the closure. While the various expanding liquid systems have varying performance properties, the expansion and curing properties are specified for each liquid expanding system, therefore the volume of the closure can be estimated and the appropriate amount of sealant added to the closure. Usually the closure will then be vented until the air is vented from the closure and the foaming liquid sealant begins to flow from the vent. Depending on the pressure desired in the closure the vent can be closed immediately to produce a high pressure, or it can be left opened until the flow of foaming sealant begins to decrease and the vent then closed to produce a lower pressure inside the closure. In this regard it is only necessary to have sufficient pressure to force the sealant into the splice connectors and into the interstices between the conductors in the cables while the sealant is in a liquid form. The pressure generated inside the closure will then be maintained while the sealant cures.

Referring to FIG. 1 will illustrate the use of the method of this invention. Cables 1 and 2 have been spliced and closure 3 placed around the splice and heat recovered to form a tight seal around the cable jackets. Filler pipe 4 with shutoff valve 5 is provided in which funnel 6 can be placed for introducing the sealant into closure 3. Vent pipe 7 with shutoff valve 8 is also provided for venting the air from the system when the sealant begins to expand and for venting a portion of the sealant from the closure as it expands. Then shutoff valve 8 is closed in order to allow the expanding sealant to increase the pressure inside closure 3. Pressure transducer 9 is provided to monitor the pressure inside the closure.

EXAMPLE

A test sample was prepared in accordance with FIG. 1 using a Western Electric type AFWM 400 pair Flex gel filled containing 24 gauge conductors with PIC insulation. The conductors were spliced with Western Electric 710-SB1-25 modular nonfilled connectors. The cable shields were connected with a type D, AT-8688 size 2 bond clamp with a Raychem Type 6 bond bar. The splice was prepared for a 20 inch opening with two banks of connectors in a fold-back configuration. The closure employed was an XAGA 2000 heat-recoverable wraparound closure available from Raychem Corporation. The closure was prepared in accordance with FIG. 1 description above, with the pressure transducer, the filler tube and vent tube as illustrated. After installation the closure was pressure tested with air to assure good seals around the cable jackets and the filler tubes, and to verify the pressure indication of the pressure transducer. The splice closure was positioned about 70 degrees above horizontal and the sealant material introduced through the filler tube using gravity flow.

The expanding sealant used in this test was a two part polyurethane foam available from Foam Systems under the designation FSC-30 77/1/16, which had an initial viscosity upon mixing the two parts of about 200 centipoise at room temperature, about 60 seconds cream time, about 150 seconds rise time and about a four hour cure at 20 degrees Celsius. This foam provides about 300 percent expansion in volume from the liquid state to the fully expanded unrestricted foamed state and when cured provides a semiflexible foam having 90 percent closed cell construction. In the closure, the expansion was less than 300 percent, thus producing the pressure desired.

About one gallon of the mixed two part system was introduced into the closure through a one inch filler pipe, which was then closed with a valve. The smaller ¼ inch vent tube remained open to vent the air from the closure as the foam expanded. The vent tube was closed when the foam flowing out of the vent tube became a homogeneous foam, indicating that no more air was being vented. During this time the pressure in the closure increased to about 15 psig. After the vent tube was closed the pressure in the closure increased to about 20 psig. After the expanded sealant had cured the splice was subjected to a waterhead test where the waterhead is applied to the core of the cable. The following table sets forth the results of the waterhead test and shows the pressure remaining in the system after the expanded sealant had cured. In the following test the waterhead was first introduced at four feet for three days, and then the waterhead was raised to a level of eight feet.

TABLE I

| Time | Pressure (psig) | Pairs of Conductors Failed |
|---|---|---|
| before waterhead test | 4.36 | 0 |
| after 4 hours at 4-foot waterhead | 5.46 | 0 |
| after 3 days at 4-foot waterhead | 3.90 | 0 |
| after 1 day at 8-foot waterhead | 3.94 | 0 |
| after 2 days at 8-foot waterhead | 3.99 | 9 |
| after 3 days at 8-foot waterhead | 3.21 | 9 |

What is claimed is:

1. A method for protecting a splice connecting at least two multi-conductor electrical cables from ingress of water which comprises:
    (a) positioning a closure about the splice and sealing the closure to the cable jackets to form an enclosed area for the splice and the cable ends wherein the closure has an opening for introducing sealant into the enclosed area and a vent opening for venting air therefrom;
    (b) introducing into the enclosed area a liquid sealant which will expand at least 50 percent in volume and will cure to a solid form to protect the splice, wherein the amount of the liquid sealant introduced into the enclosed area inside the closure is such that when the sealant expands the volume of the expanded sealant will exceed the volume of the enclosed area by a sufficient amount to generate pressure inside the closure to force the expanding sealant to penetrate into the splice and into the interstices between the conductors in the cables;
    (c) allowing air to escape from the vent opening while the sealant is expanding;
    (d) closing the vent opening while the sealant is expanding; and
    (e) allowing the sealant to expand and generate said pressure and to cure under said pressure.

2. The method of claim 1 wherein the sealant is a urethane which expands to form a foam.

3. The method of claim 1 wherein the sealant is capable of expanding at least 100 percent in volume.

4. The method of claim 1 wherein the sealant expands to form a predominantly closed cell foam structure when cured.

5. The method of claim 1 wherein the sealant is a two-part polyurethane.

* * * * *